Feb. 26, 1929.  R. P. WHITE  1,703,185
DISPLAY JAR
Filed Oct. 5, 1925   7 Sheets-Sheet 1

Inventor
Richard P. White
By Gillson Mann & Cox
Attys.

Feb. 26, 1929.  
R. P. WHITE  
DISPLAY JAR  
Filed Oct. 5, 1925  
1,703,185  
7 Sheets-Sheet 2

Inventor:
Richard P. White
By Gillson, Mann & Cox
Attys.

Feb. 26, 1929. R. P. WHITE 1,703,185
DISPLAY JAR
Filed Oct. 5, 1925 7 Sheets-Sheet 3
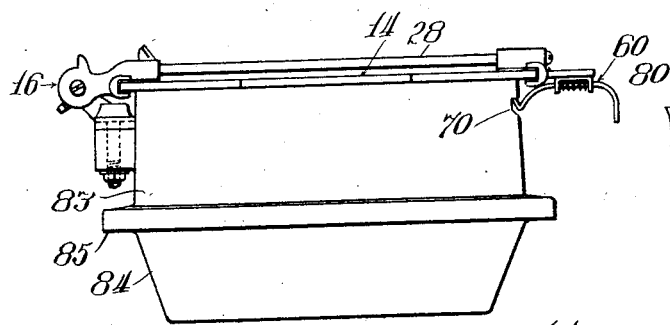
Fig. 14.
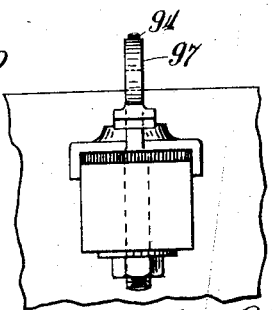
Fig. 20.
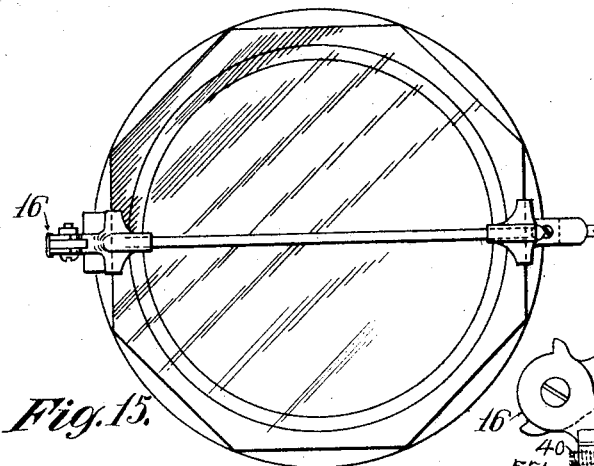
Fig. 15.
Fig. 18.
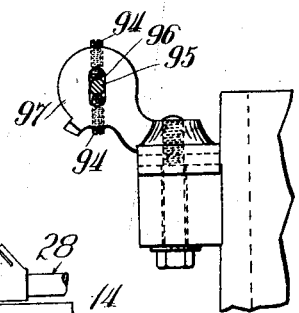
Fig. 21.
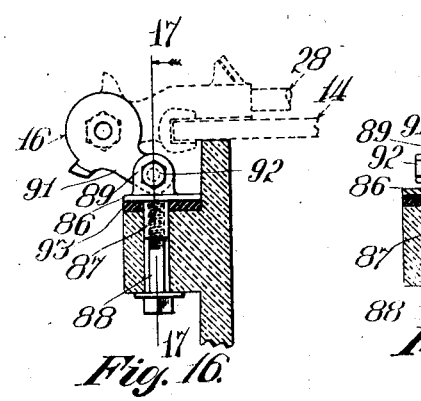
Fig. 16.
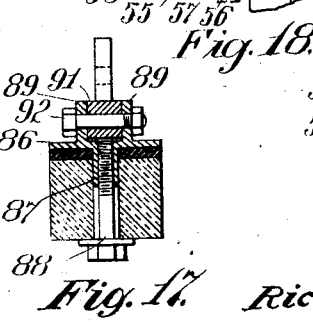
Fig. 17.
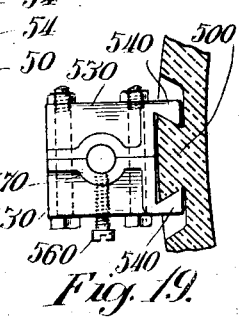
Fig. 19.
Inventor:
Richard P. White
By Gillson, Mann & Cox
Attys.

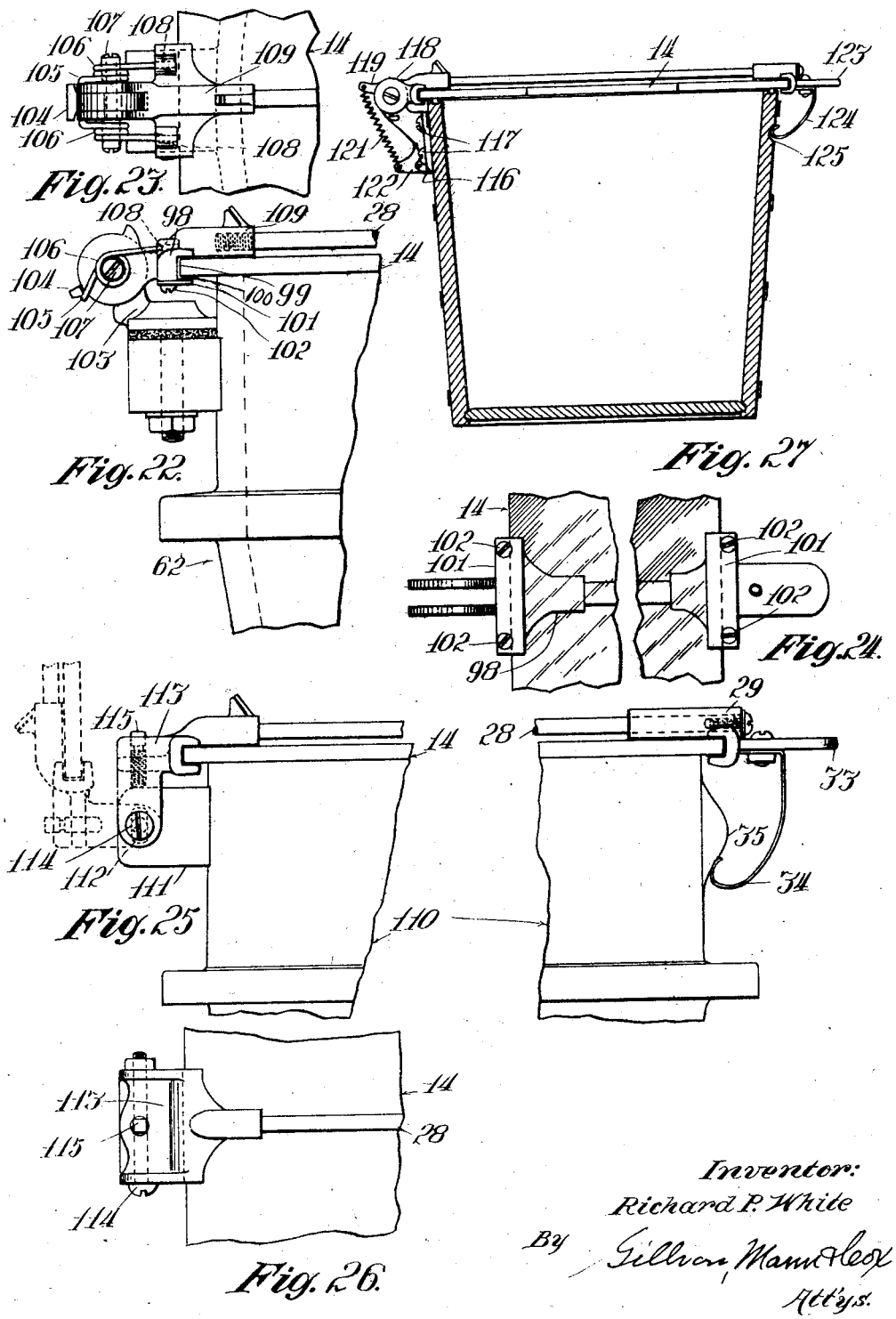

Feb. 26, 1929.   1,703,185
R. P. WHITE
DISPLAY JAR
Filed Oct. 5, 1925   7 Sheets-Sheet 5

Inventor:
Richard P. White
By Gillson, Maurer & Cox
Att'ys.

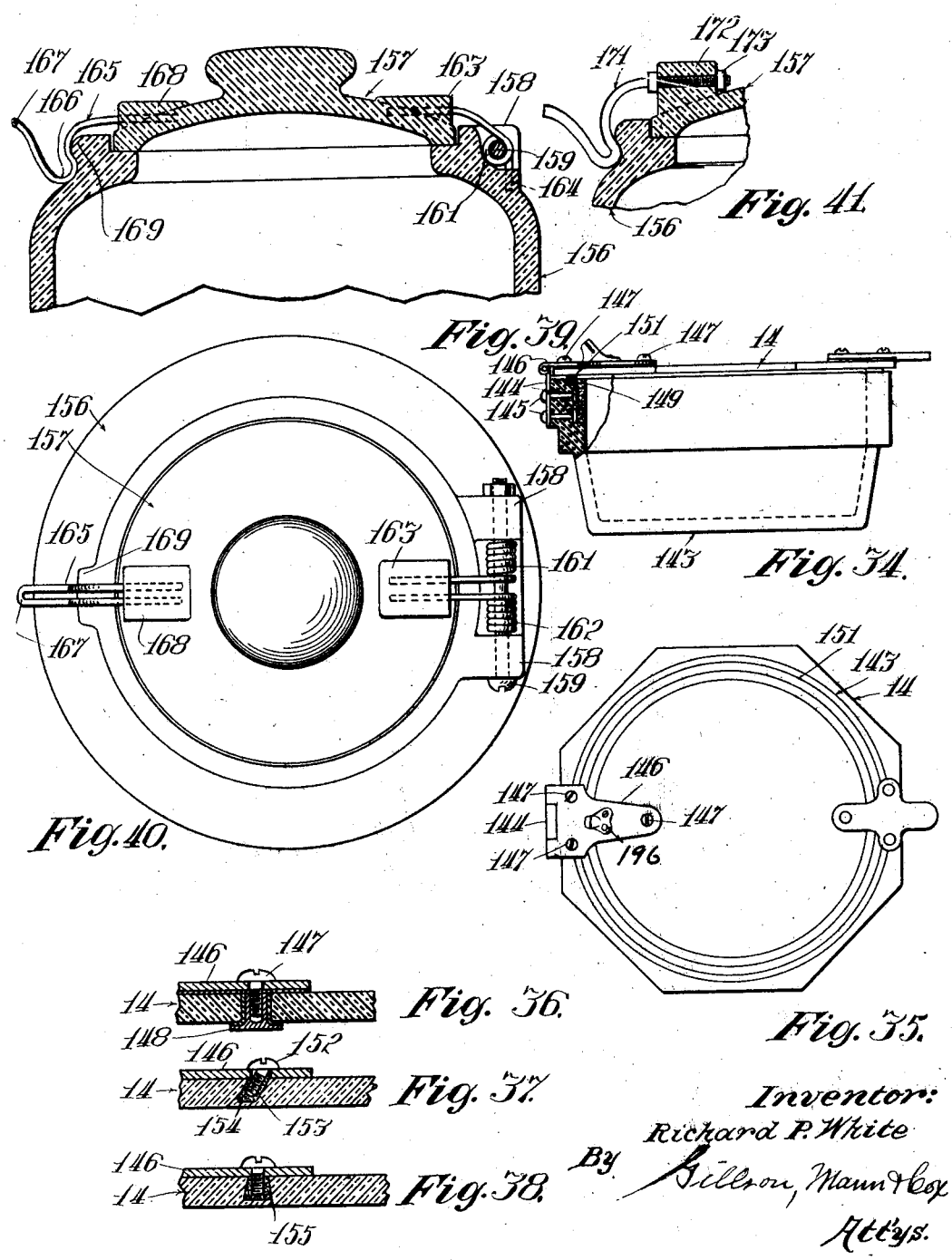

Feb. 26, 1929.
R. P. WHITE
1,703,185
DISPLAY JAR
Filed Oct. 5, 1925
7 Sheets-Sheet 7
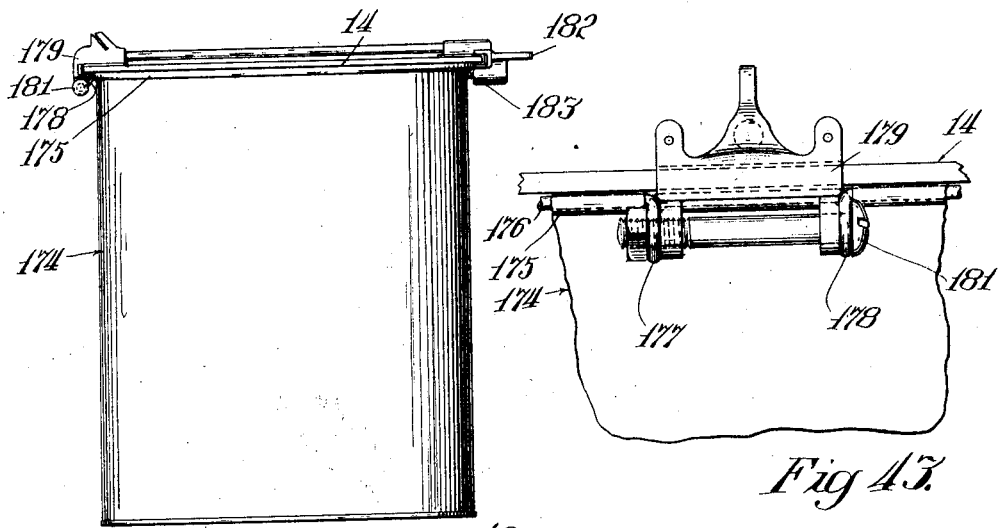
Fig. 42.
Fig. 43.
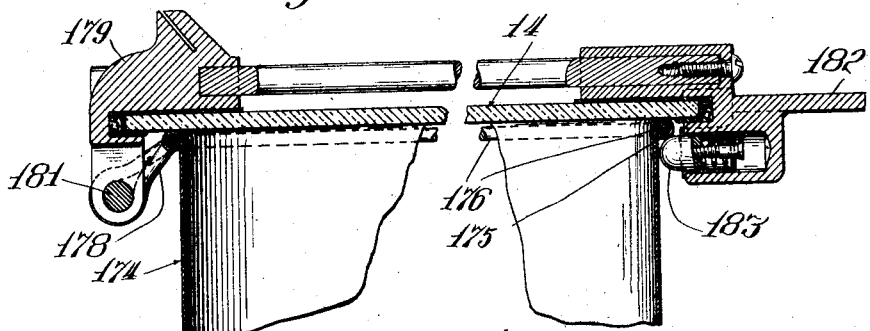
Fig. 44.
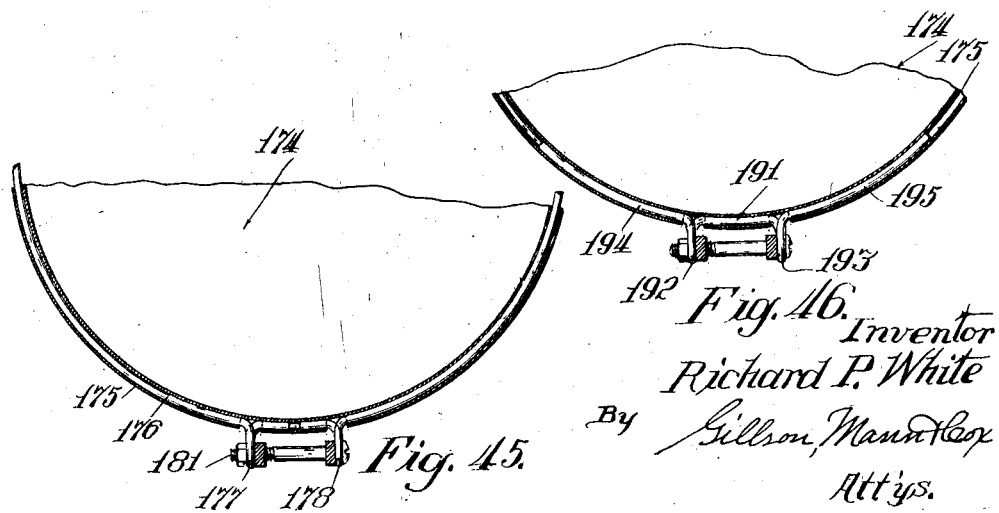
Fig. 45.
Fig. 46.
Inventor
Richard P. White
By Gillson, Mann & Cox
Att'ys.

Patented Feb. 26, 1929.

1,703,185

UNITED STATES PATENT OFFICE.

RICHARD P. WHITE, OF CHICAGO, ILLINOIS.

DISPLAY JAR.

Application filed October 5, 1925. Serial No. 60,434.

This invention relates to display devices and more particularly to display lids and mechanism for attaching the same to the vessels containing the goods to be exhibited.

In order to appeal to purchasers it is desirable that goods contained in vessels be displayed to the best advantage and at the same time be properly protected from dust, dirt and the like. It has been found that this may be accomplished by means of a glass cover for the vessel, which may be made to fit the container practically air-tight and will not only permit inspection of the goods through the transparent cover but will keep out the dust laden air, and, in case of a liquid in the container, prevent its evaporation or contamination by the atmosphere.

As heretofore constructed adequate provision has not been made for properly protecting the glass covers from breaking should the hand slip therefrom while raising the same, consequently accidents frequently happen, resulting in a broken cover and consequent loss of goods due to broken glass falling in the container. Furthermore, since display covers vary in thickness the replacing of new covers for old ones often results in an imperfect fit due to the non-adjustability of the holder to the cover or container. One of the objects of the present invention is the provision of new and improved means for overcoming these difficulties, by providing means either for cushioning the fall of the lid or for holding the same in elevated position should the hand slip from the same while raising the lid.

The principal object of the invention is the provison of novel means for remedying these difficulties by providing new and improved means for mounting the display cover on the receptacle.

Another object of the invention is the provision of new and improved means for adjusting the lid on its mounting whereby the same may be made to make a close fit on the top of the display receptacle.

A further object of the invention is the provision of a new and improved display lid mounting that is adjustable to fit lids of different sizes and thicknesses, together with means for holding a display card.

A still further object of the invention is the provision of a display vessel, cover and mounting therefor that is cheap to manufacture, simple in construction, easily assembled, readily adjusted, efficient in operation, and that is not likely to become broken or get out of order.

Other and further objects and advantages of the invention will appear from the following description taken in connection with the accompanying drawings, in which Fig. 1 is a side elevation of a display jar and lid therefor, showing my invention in position thereon, with parts in section;

Fig. 14 is a side elevation of a display jar showing a still further modified form of the hinge mounting and latch for the display lid;

Fig. 15 is a plan view thereof;

Fig. 16 is a vertical section through the hinge lug showing a still further modified form of hinge mounting for the lid;

Fig. 17 is a section on line 17—17 of Fig. 16;

Fig. 18 is a side elevation of a portion of a jar showing a modified form of hinge lug, with parts broken away;

Fig. 19 is a plan view of a portion of a jar showing a still further modified form of hinge lug;

Fig. 20 is a rear elevation of a portion of a display jar showing a modified form of the lower portion of the hinge;

Fig. 21 is a side elevation of the same;

Fig. 22 is a side elevation of a portion of a display jar showing another modified form of hinge mounting for the display lid;

Fig. 23 is a plan view thereof;

Fig. 24 is a bottom plan view of the display lid, showing the clamping mechanism attached thereto, with parts broken away;

Fig. 25 is a side elevation of a display jar and lid therefor, with a modified form of hinge for the lid, with the lower and intermediate portions of the jar broken away;

Fig. 26 is a plan view thereof;

Fig. 27 is a vertical section of a display vessel with a modified form of the device for holding the lid in elevated position;

Fig. 34 is a side elevation of a display jar showing a further modified form of hinge mounting, with parts in section;

Fig. 35 is a plan view thereof;

Figs. 36, 37 and 38 are vertical sections of a portion of the hinge and display lid showing different forms of attaching the hinge to the lid;

Fig. 39 is a vertical section of a portion of a display jar showing a modified form of hinge mounting for the display lid or cover;

Fig. 40 is a plan view thereof;

Fig. 41 is a vertical section of a portion of a display jar and lid or cover therefor, with a modified form of latch for holding the cover in lowered position;

Fig. 42 is a side elevation of a display bucket showing a modified form of hinge mounting for the display cover;

Fig. 43 is a rear elevation thereof, with parts in section;

Fig. 44 is a vertical section thereof through the hinge and latch, with parts broken away;

Fig. 45 is a plan view of one section of the hinge and a portion of the container, with parts in section and parts broken away; and Fig. 46 is a view similar to Fig. 44 but showing a modified form of hinge mounting.

Figure 1:
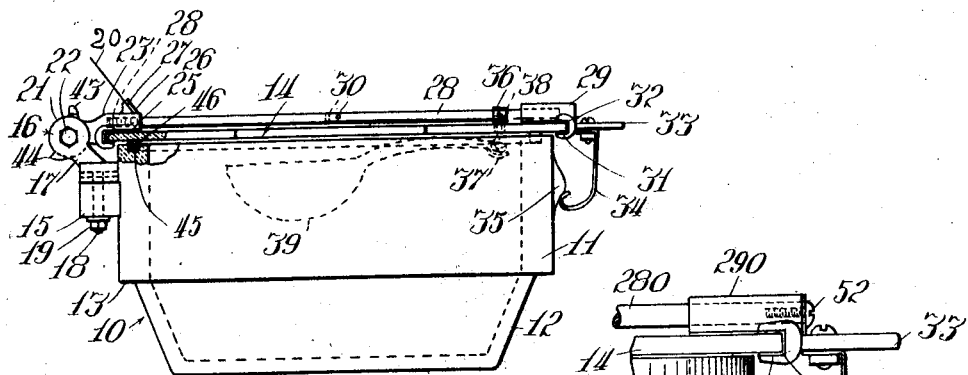

On the drawing, reference being had to Figs. 1 to 4, the numeral 10 designates a display jar or vessel, which, as shown, is of earthenware and comprises an upper cylindrical portion 11 and a lower conical section 12. The wall of the cylindrical portion 11 is thicker than the wall of the tapered portion 12 whereby an annular shoulder 13 is provided which is adapted to engage the upper ends of the staves of a barrel for supporting said jar thereon.

A considerable amount of delicatessen, such as olives, pickles and the like, are shipped to the dealers in barrels. In displaying the goods, portions of the same, after removing the head of the barrel, are placed in the display jar and the jar set in the upper end of the barrel. The space formed in the barrel by the removal of the goods transferred therefrom to the display jar, will be sufficient to receive the tapered portion 12 of the jar, and the diameter of the cylindrical portion 11 being greater than that of the barrel the shoulder 13 will support the jar on the barrel.

The display jar 10 is provided with a transparent cover, lid or closure 14, which preferably is of glass in order that the same will not be affected by vinegar and the like contained in the earthen jar 10. The cover may be of any desired form, that shown being octagonal although it is understood it may be otherwise.

Figure 2:
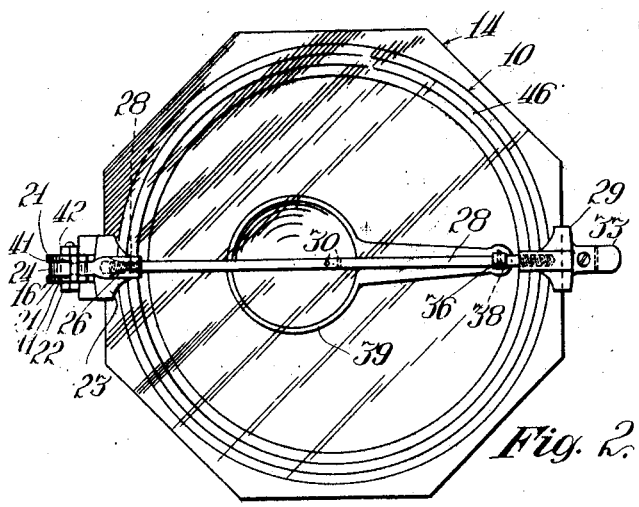
Fig. 2 is a plan view of the same.
Figures 5, 6, 7:
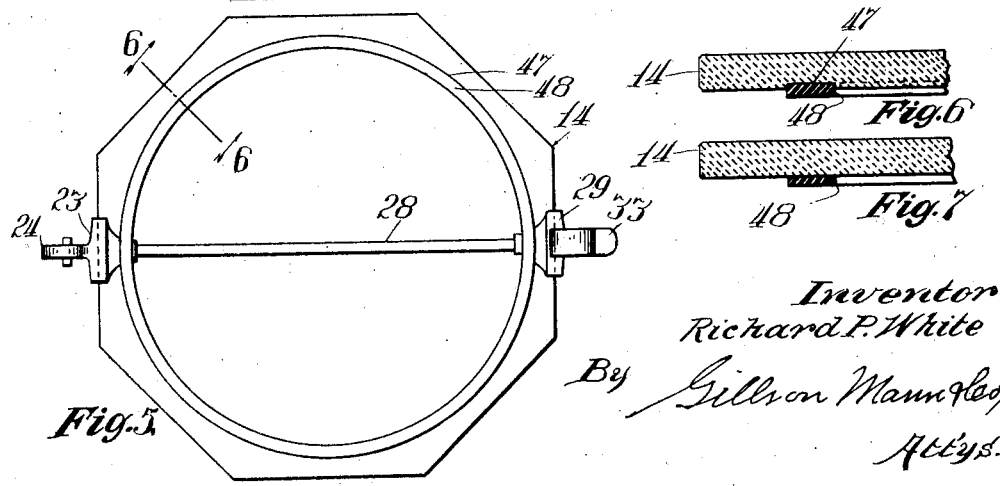
Fig. 5 is a plan view of a display lid showing a different arrangement of gasket.
Fig. 6 is a section on line 6—6 of Fig. 5.
Fig. 7 is a view similar to Fig. 6, but showing a still further modified arrangement of the gasket.
Figure 10:
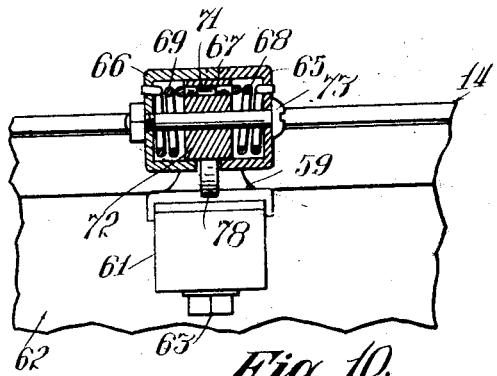
Fig. 10 is a section on line 10—10 of Fig. 8.
Figure 11:
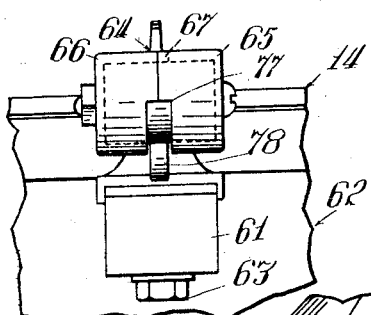
Fig. 11 is a rear elevation of a portion of a jar showing the hinge mechanism.
Figure 8:
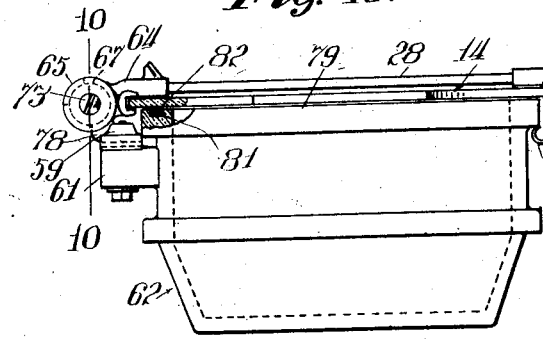
Fig. 8 is a side elevation of a modified form of display jar and mounting for the lid, with parts in section and parts broken away.
Figure 12:
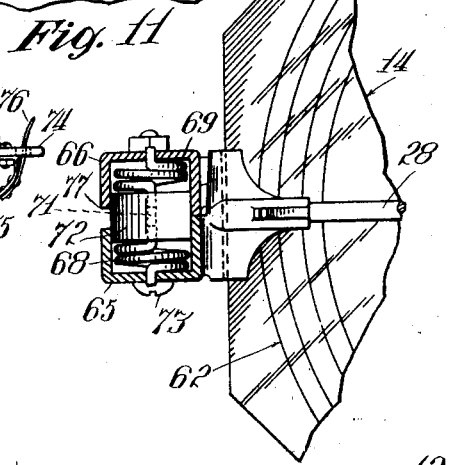
Fig. 12 is a horizontal section of the hinge.

Suitable means are provided for hinging the glass to the jar. In Figs. 1, 2 and 5 is shown one form of mechanism for accomplishing this function. In these figures the jar 10 is shown as being provided with a laterally extending lug 15 preferably integral therewith to which the hinge 16 is adapted to be connected.

The hinge 16 comprises a lower hinge member 17 having a reduced shank portion 18 which extends downwardly through the opening in the lug 15 and is secured therein by any suitable fastening means, as the nut 19. The upper end of the hinge member 17 is provided with a shank terminating in a bifurcated portion, the furcations 21 of which are provided with alined apertures for the reception of the hinge bolt 22.

The upper hinge member 23 of the hinge 16 is provided with a perforated disk 24 which is adapted to be pivoted on the bolt 22 between the furcations 21. The hinge member 23 is provided with a slot 25 for receiving one edge of the glass cover 14. The hinge member 23 is also provided with a lug 26 having a kerf 27 therein for the reception of a display card 20. Preferably the kerf is inclined rearwardly in order that the card may be more clearly seen and more easily read by the prospective customer.

The hinge member 23 is provided with a threaded opening in which is secured the threaded end of the tie rod or bar 28, the other end of which is threaded into a corresponding socket in the clip or clamping member 29. The member 29 is provided with a slot 31 for receiving the edge of the glass cover 14. The rod 28 may be provided with apertures 30 in which a suitable tool may be inserted for turning the same. The threads on the ends of the rod 28 are rights and lefts whereby the cover 14 may be clamped in the slots 25 and 31. The slots 25 and 31 may be provided with suitable cushioning members 32 for protecting the edge of the glass cover.

The clamping member 29 is provided with a forwardly projecting member or handle 33 for lifting the cover. The handle 33 has attached thereto a latch 34 of spring metal which is adapted to engage a lug 35 formed integral with the cylindrical portion 11 of the display jar.

If desired the tie rod or bar 28 may be provided with a collar or clip 36 to which a hook member 37 is adapted to be attached. The hook member 37 is provided with a shank 38, see Fig. 3, which extends through the display cover 14 and is screw-threaded for engaging threaded openings in the ends of the clip 36. This hook may be covered by rubber or any suitable acid resisting material. The hook member is adapted to engage an opening in the end of the handle or ladle 39 for retaining the same above the liquid in the display jar.

It is desirable that means be provided for holding the display lid and prevent the same from falling should the hand become disengaged from the handle 33 while lifting the lid. As shown, this is accomplished by clamping the furcations 21 against the disk 24 of the upper section of the hinge. If desired, friction washers 41 which may be of fibre, may be interposed between the furcations 21 and the disk 24. By tightening the nut 42 the desired amount of friction for holding the lid at any elevation is secured. If desired the hinge members may be provided with cooperating shoulders 43, 44 for limiting the upward movement of the lid. These shoulders are so arranged that when they are engaged the lid is opened past dead center.

Suitable means are provided for preventing the glass cover from coming in contact with the jar, and breaking, should the friction of the hinge not be sufficient to hold the cover in case the hand becomes disengaged from the handle 33. Any suitable means may be provided for this purpose. As shown, the upper edge of the display jar is provided with a groove 45 in which is mounted a gasket of rubber or the like, 46. This gasket will also make an air-tight fit with the lid, thereby preventing the entrance of dust and the like.

In the form of the device shown in Fig. 5 the gasket is mounted on the display lid. In mounting the gasket on the lid the latter may be provided with a groove 47, see Fig. 6, in which a gasket 48 is adapted to be secured in any suitable manner as by means of cement. In Fig. 7 the gasket 48 is secured directly to the under surface of the cover 14 as by means of cement.

Figure 3:
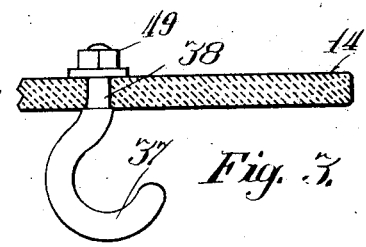
Fig. 3 is a vertical section of a portion of a display lid showing a modified form of holder for the ladle.

In Fig. 3 is shown a different manner of securing the hook 37 to the cover 14. In this form of the device a nut 49 secures the hook directly to the cover.

Figure 4:
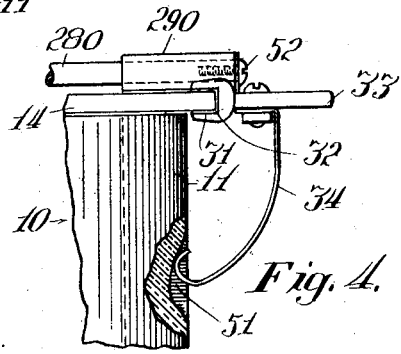
Fig. 4 is a side elevation of a portion of a display jar showing a modified form of latch for holding the lid in closed position.

In the modified form of the device shown in Fig. 4 the spring latch 34 is adapted to engage a recess 51 formed in the side of the jar for holding the cover in lowered position. In this form of the device the tie rod or bar 280 engages a bore in the clamping member 290 and is secured therein by means of a screw 52 which is tapped into the end of said bar.

Figure 9:
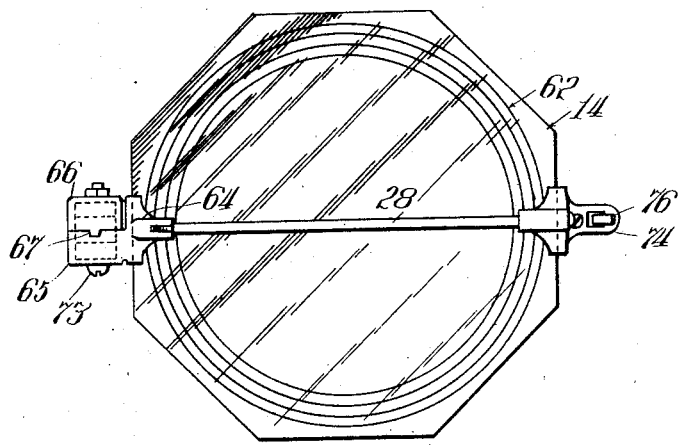
Fig. 9 is a plan view of the same.
Figure 13:
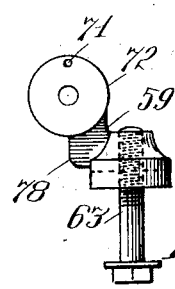
Fig. 13 is a side elevation of the lower hinge member.

The form of the device shown in Figs. 8 to 13 inclusive differs from that shown in Figs. 1, 2 and 5 in that means are provided for automatically elevating the display cover when the latch is released. The lower section 59 of the hinge is secured to the lug 61 of the display jar 62 by means of a bolt 63 which extends upwardly through an aperture in said lug and is tapped in the member 59, as clearly shown in Fig. 13. The upper section 64 of the hinge is provided with a housing 65 integral therewith. A complementary housing 66 interlocked with the housing 65 as at 67, see Fig. 9, is adapted to form with the housing 65 a casing for containing the springs 68 and 69. The outer ends of the springs 68 and 69 engage openings in the housings 65 and 66 and their inner ends engage an opening 71 in the cylindrical bearing 72 of the lower section of the hinge (see Fig. 13). A bolt or hinge pintle 73 extends through the housings in the bearing 72 for connecting the parts together.

The handle 74 is provided with a spring latch 75 to which is attached a thumb piece 76 that extends up through an opening in the handle 74. The springs 68 and 69 are so arranged that when the latch 75 is released by pressing on the thumb piece 76 the display lid will be elevated by said springs.

The housings 65 and 66 have adjacent portions cut away to form a slot 77 for the reception of the supporting shank 78. The end of this slot is adapted to engage the shank 78 for limiting the upward movement of the display cover 14. In this form of the device the upper edge of the display vessel 79 is provided with a dovetailed groove 81 in which a gasket 82 of corresponding shape is adapted to be inserted. In this arrangement of gasket it is not necessary to provide cement for holding the same in position.

The form of the device shown in Figs. 14 and 15 differs from that shown in Figs. 1 and 2 in that a different type of display vessel and a different form of latch are employed. In this form of the device the display jar comprises an upper cylindrical portion 83 and a lower tapered portion 84 with a laterally extending ledge or flange 85 at their juncture. In this form the external diameter of the cylindrical portion 83 is substantially the same as that of the upper end of the tapered portion 84.

By means of this arrangement a smaller display lid may be employed. The ledge or flange 85 is adapted to engage the upper end of the barrel, the same as the shoulder 13 in the form of the device shown in Fig. 1.

The lid is held in lowered position by means of the spring-pressed bolt or latch 60 having its inner end bent to engage a notch 70 in the jar and its outer end bent to form a handle 80 for withdrawing the latch. This type of latch may also be employed instead of the spring latches shown in the other figures, if desired.

Since display lids are not all of the same thickness it often happens that in replacing a cover that has been broken the new one will be of less thickness than the broken one, and consequently will not form a close or tight fit with the top of the display jar. It is desirable therefore that suitable means be provided for adjusting the mounting so that the cover will engage the top of the display vessel. In the form of the device shown in Figs. 16 and 17 this is accomplished by forming the lower section of the hinge in sections and rigidly connecting them together in adjusted position. As shown, the lug engaging member 86 of the hinge is provided with a tubular member 87 which is adapted to engage the opening in the attaching lug. The tubular member 87 is internally threaded for receiving the threaded end of a pin or bolt 88 for holding the same rigidly on said lug. The member 86 is provided with upwardly extending perforated lugs 89 between which is adapted to be clamped the lower end of the hinge member 91. The upper section of the hinge is connected to the hinge member 91 in the usual manner.

When it is desired to raise or lower the hinge member for accommodating display covers of different thicknesses the bolt 92 is released and the hinge member 91 turned to the desired position, after which the nut on the bolt 92 is tightened to clamp the members rigidly together.

If desired, a shim or washer 93 may be inserted between the member 86 and the lug to which it is attached. By varying the size of the washer or removing the shim the hinge may be raised and lowered as is evident.

In Figs. 18 and 19 are shown modified forms of hinge lugs. Instead of forming the lugs integral with the jar they may be formed of non-frangible material and attached to the jar by suitable means.

In the form shown in Fig. 18, a dove-tailed recess 50 extending horizontally is provided in the jar on the outside near the upper end thereof. A pair of blocks 53 having undercut projections 54 are provided for forming the hinge lug. They are held in assembled relation with the projections 54 in the recess 50 by a screw 55 which slidably engages an aperture through the lower block 53 and is threaded into the upper block 53. A set screw 56 in the lower block 53 is adapted to engage the upper block for spreading the projections 54 in said recess 50. The blocks 53 are provided with a vertical aperture 57 for receiving the shank 58 of the hinge. A set screw 40 is provided for holding the shank 58 in vertically adjusted position.

The form of lug construction shown in Fig. 19 differs from that just described in that the blocks 530 for forming the hinge lug are provided with undercut projections 540 that are adapted to clamp a dovetail projection 500 formed by two vertically arranged slots in the outer surface of the jar. The blocks are provided with semi-circular recesses which together form a vertical opening 570 for receiving the shank of the hinge. The set screw 560 is adapted to hold the shank of the hinge in vertically adjusted position as in Fig. 18.

In the form of the device shown in Figs. 20 and 21 the vertical adjustment of the portion of the hinge attached to the display cover may be accomplished by means of set screws 94 which are adapted to engage the hinge pintle 95 for raising or lowering the same in a slot 96 provided in the lower hinge member 97.

In the form of the device shown in Figs. 22 to 24 the vertical adjustment of the cover is accomplished by forming the slotted portions of the holding member in sections and employing shims for raising or lowering the display cover. In this form of the device the upper section 98 of the hinge is rabbeted as at 99 for the reception of the edge of the lid. The lid is held in position thereon by means of the retaining member 101. The retaining member is secured in position by any suitable means, as the screws 102. The width of the groove formed by the rabbet 99 and the member 101 is wider than is necessary for receiving the thickest lid or cover. The cover may then be adjusted in the groove by the addition or removal of shims 100 either above or below the cover as necessity or occasion may require.

The form of the device shown in Figs. 22 to 24 differs from that shown in Figs. 8 to 13 inclusive in that the spring for elevating the cover is not protected by a housing. Furthermore, a single spring is employed for this purpose instead of the double springs as employed in the device previously described. In this form of the device the lower section 103 of the hinge is provided with a shoulder 104 beneath which the loop 105 of the elevating spring 106 is adapted to engage. The ends of the spring 106 are wound about the ends of the pintle 107 of the hinge and are anchored in recesses 108 in the upper section 109 of the hinge. The hinge is so arranged that it will automatically elevate the display lid when the same is released.

In Figs. 25 and 26 is shown a still further modified form of hinge mounting. In this form of the device the lower section of the hinge is dispensed with. The display vessel or jar 110 is provided with a hinge lug 111 having an elongated slot 112 extending transversely therethrough. The upper section 113 of the hinge is provided with downwardly extending members which are pivotally connected to the lug 111 as by means of the hinge pintle 114. The upper section 113 of the hinge is also provided with a set screw 115 which is adapted to engage the curved upper surface of the lug 111. By adjusting the screw 115 in the member 113 the same may be raised and lowered to the desired position, the slot 112 permitting the vertical movement of the hinge pintle 114. By adjusting the set screw the display cover may be made to make a tight fit with the upper end of the display vessel.

In Fig. 27 is shown a modified form of the device which is adapted to be attached to a wooden display vessel. In this form of the device the lower section 116 of the hinge is adapted to be secured to the vessel as by means of the screws 117. The upper section 118 of the hinge is provided with a rearward extension 119 to which is adapted to be connected the upper end of a tensile spring 121, the lower end of which is secured to a projection 122 on the lower section 116. The handle 123 of the holder for the display lid is provided with a spring latch 124 which is adapted to automatically engage a notch 125 in the side of the display vessel when the lid is lowered for holding the lid in lowered position. The latch 124 is so constructed that by an upward pull on the handle 123 the same will become automatically disengaged from said notch.

Figure 28:
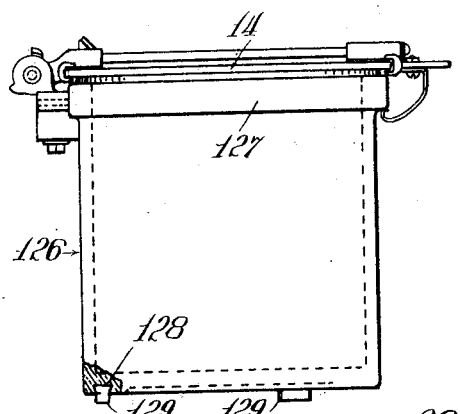
Fig. 28 is a side elevation of a display jar and lid therefor, with parts broken away.
Figure 29:
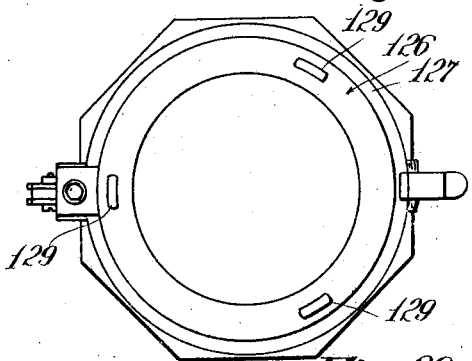
Fig. 29 is a bottom plan view thereof.

The form of the device shown in Figs. 28 and 29 differs from those described above in that a different type of display jar is employed. In this form of the device the jar is not intended to be placed in the top of a barrel for display purposes. The jar may be placed on the counter if desired. The jar comprises a cylindrical portion 126 the upper end of which is provided with a bead or flange 127 as is usual in such constructions.

In order to prevent marring of the surface on which the jar is supported the lower end of the jar is provided with a plurality of dovetailed recesses 128 in which are secured rubber pads or feet 129 which are adapted to be pressed in said grooves and extend downwardly beyond the bottom of the jar. If desired the grooves or recesses 128 may be extended so as to form a continuous groove about the jar bottom, in which a rubber ring may be secured for supporting the jar.

Figure 30:
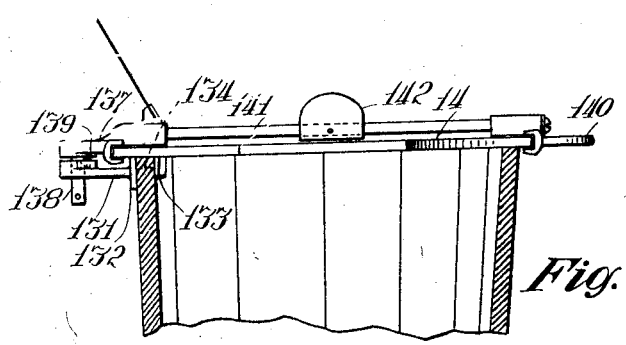
Fig. 30 is a vertical section of a display vessel with a modified form of hinge mounting for the lid.
Figure 32:
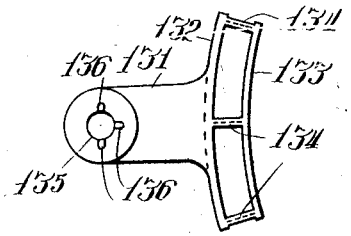
Fig. 32 is a plan view of a lower section of the hinge mounting shown in Figs. 30 and 31.
Figure 31:
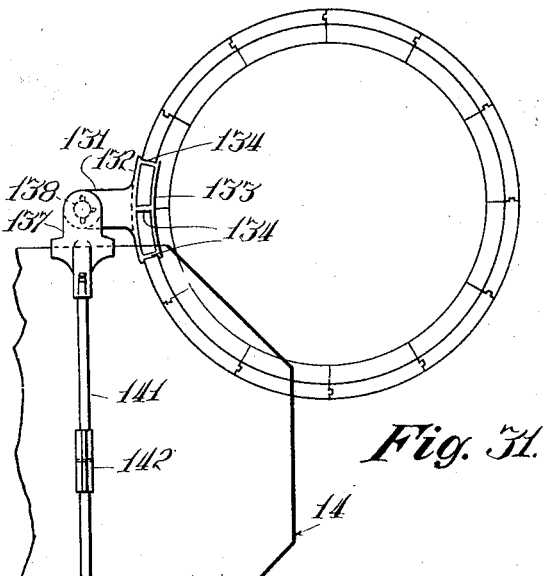
Fig. 31 is a plan view thereof with parts broken away.

In Figs. 30 to 32 is shown a modification of the device adapting it to be used on a wooden pail or bucket. This is especially adapted for displaying candies and the like. In this form of the device the lower section of the hinge 131 is provided with a pair of downwardly extending curved flanges 132, 133 for engaging the inner and outer surfaces of the side wall of the pail.

A plurality of wedge-shaped members 134 connect the flanges 132 and 133 and these wedges are adapted to be driven into the upper end of the bucket wall for holding the section 131 of the hinge in position on the bucket. The section 131 is provided with a vertical opening 135 having laterally extending recesses 136 at the upper surface of said section. The upper section of the hinge 137 is provided with a pin 138 for engaging said opening and is also provided with a downwardly extending lug 139 which is adapted to engage the recesses 136 for holding the hinge in adjusted position. The tie rod 141 is provided with a thumb piece or handle 142 for opening the cover. When it is desired to open the cover the same is lifted by means of the handle 142 and turned laterally about the pin 138 until the lug 139 engages one of the recesses 136. Any suitable number of recesses 136 may be provided. As shown, three are employed, one for holding the cover in closed position and one for holding the lid when it is turned to either side of the bucket.

The rod 141 may also be provided with a handle 140 for use in opening the lid.

Figure 33:
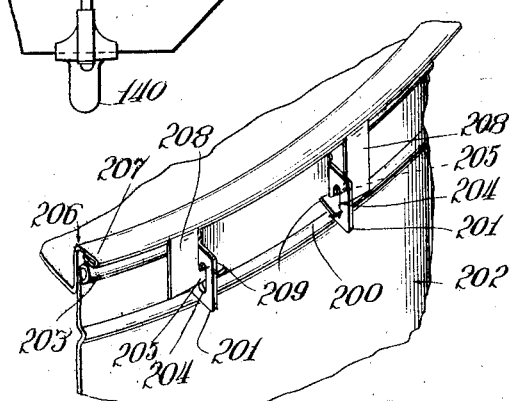
Fig. 33 is a perspective of a portion of a different type of receptacle, showing a still further modified form of hinge with parts in section and parts broken away.

In Fig. 33 is shown a modified form of hinge which is especially adapted for tin vessels. In this form of the device one or more hinge lugs 200 are secured to the vessel 202. Preferably they are formed integral with the bead 203. Each lug is provided with a projection 201 bent at a right angle to or radially of the vessel and is provided with a vertical slot 204, for the reception of the attaching member 205 of the upper portion of the hinge. The lid, closure or cover 206 is the usual type that is adapted to telescope into the top of the vessel with its flange 207 engaging the bead 203 when the lid is in closed position. The lid is provided with projections 208 which may be secured thereto in any suitable manner as by being integral with the flange 207. As shown, the projections 208 are provided with the laterally extending attaching members 205 forming the upper member of the hinge. The attaching members 205 extend inward toward each other and are provided with transverse heads 209 which are adapted to be inserted through the slots 204.

In attaching the lid or cover one or both of the projections are bent inwardly, the lid is turned until the heads 209 are in alinement with the slots, after which the projections are bent outwardly causing the heads to pass through the slots 204. The heads prevent the withdrawal of the attaching member and also prevent the spreading of the attaching members when the lid is in closed or partly closed position.

In Figs. 34 to 38 inclusive is shown a modified form of the mounting for the cover. In this form of the device the jar 143 is substantially the same as that shown in Fig. 1. The hinge for connecting the lid 14 to the jar 143 may be the usual or common type of strap hinge the lower leaf 144 of which is secured to the jar by means of bolts or screws 145 countersunk from the inner side of the jar. The countersinks are filled with cement to prevent the acid contained in the foods from attacking the hinge attaching bolts.

The upper section 146 of the hinge is attached directly to the glass as by means of screws 147 engaging threaded sockets 148 extending through openings formed in said lid, see Fig. 36. The upper edge of the jar is provided with a dovetailed groove 149 in which is adapted to be secured a rubber gasket 151 for preventing the cover from coming in contact with the edge of the jar, and also for sealing the joint between the cover and the jar in order to prevent the entrance of dirt, dust and the like.

Fig. 37 shows a modified form of attaching the screw 152 to the glass cover 14. In this form of the device the recess 153 is made in the upper surface of the lid and the same is partially filled with cement 154 after which the screw is placed in position, and when the cement dries the parts will be firmly held together. If desired the recess 153 may be arranged at an angle to the upper section of the hinge 146.

The form of the device shown in Fig. 38 differs from that in Fig. 37 in that a dovetailed recess 155 is employed for receiving the cement and end of the screw.

In Figs. 39, 40 and 41 is shown an adaptation of the mounting for the display lid for use on a glass display jar for candy, gum, etc. In this form of the device the glass jar 156 is rabbeted at its upper end to receive the cover 157 as is usual in such constructions. The upper end of the jar is provided with spaced lugs 158 in which is secured a bolt 159. A pair of coiled springs 161 and 162 constitute the upper section of the hinge. These springs are mounted on said bolt, the upper ends of the coils being secured in recesses formed in the lug 163 in the cover 157. The lower ends of the springs are secured in recesses 164 in the upper end of the jar between the lugs 158. A spring latch 165 is secured on the front portion of the cover 157 in any suitable manner. As shown, the latch 165 is formed from a single length of wire bent to form an engaging portion 166 and handle or thumb piece 167 for operating the same. The ends of the wire are secured in recesses in the lug 168. The spring is so arranged that when the latch 165 is released the spring will raise the cover to elevated position. The curvature of the engaging portion 166 is such that it will automatically engage the lug 169 on the jar for holding the cover in lowered position against the tension of the springs 161 and 162.

In Fig. 41 is shown a slightly modified form of attaching the latch 171 to the cover. In this form of the device the lid is provided with a lug 172 having an aperture therein through which the end of the latch 171 is adapted to extend. The latch is formed from a single length of wire and the end engaging the lug 172 is screw-threaded and a nut 173 engages said screw-threaded end for holding the latch in position in the lug 172.

In Figs. 42 to 45 inclusive is shown a modification of means for mounting the display cover on a sheet metal bucket. In this form of the device the lower section of the hinge is formed by the reinforcing wire for the upper end of the bucket. As shown, the bucket 174 has its upper edge rolled as at 175 in the usual manner. A reinforcing rod 176 is secured in said roll. The rod is bent to form the two eyes or loops 177 and 178 which constitute the lower member of the hinge. The upper section 179 of the hinge is pivotally connected to the loops 177 and 178 in any suitable manner as by means of the pintle or bolt 181. The front end of the cover 14 is provided with a latch for holding the cover in lowered position. As shown, the handle member 182 is provided with a spring-pressed detent 183 which is adapted to automatically engage beneath the bead 175 when the lid is lowered. The bead engaging portion of the detent is curved whereby an upper pull on the handle 182 will cause the same to be automatically retracted.

The modified form of the device shown in Fig. 46 differs from that shown in Figs. 42 and 44 in that the reinforcing wire for forming the lower section of the hinge is adapted to extend only part way around the bucket. As shown, the reinforcing wire 191 is provided with the loops 192 and 193 for engaging the hinge pintle. The ends 194 and 195 of the wire extend a short distance in opposite directions from the loops and are adapted to engage in the bead formed by rolling the upper end of the bucket.

The upper section of the hinge in the different types except that shown in Fig. 39 is preferably provided with the display card holder 26 which may if desired be integral with the hinge section, as clearly shown in Fig. 1. Or it may be attached thereto as shown at 196 in Fig. 35. In all cases the lug is provided with a kerf for holding the display card at a convenient angle to be read.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In combination, a transparent display cover and means for securing said cover to a display vessel, said means comprising a hinge member having an opening and a slot for engaging one edge of said cover, a clamping member for engaging the front edge of said cover, and means for clamping said cover between said members.

2. A mounting for a glass display cover comprising a hinge member having means for embracing one edge of a glass cover, a clamping member for embracing the opposite edge of the cover, a latch carried by said clamping member, and means for connecting said first-named means and member together.

3. A hinge mounting for a transparent lid comprising a hinge member having perforated lugs for a hinge pintle and provided with a slot for receiving the rear edge of a glass cover, a clamping member provided with a slot for engaging the front edge of said cover, a clamping rod having its rear end threaded in said hinge member and its front end detachably attached to said clamping member 4. A display device comprising a jar of earthenware having a cylindrical upper portion and a tapered lower portion, the walls of the cylindrical portion being thicker than that of the tapered portion, whereby a ledge is formed at the juncture of said portions for supporting said jar, a lid, and means for hinging said lid to said cylindrical portion.

5. A display jar having a lower tapered portion, an upper cylindrical portion having its inner surface flush with the inner surface of the wall of the tapered portion and having its outer surface offset from the outer surface of the wall of the lower portion to form a supporting ledge, a cover, a lug on said cylindrical portion, and means extending vertically through said lug for pivotally connecting said cover to said offset portion.

6. A display device comprising a jar of earthenware having a tapered lower portion, a cylindrical upper portion, a lid, and means for pivotally connecting said lid to said cylindrical portion, said means being adapted to hold said lid in a plurality of adjusted open positions.

7. A display vessel comprising a receptacle, a glass cover for said receptacle, hinge means for pivotally connecting said cover to said receptacle, said means above said cover being provided with a slot for receiving a display card.

8. A device for pivotally connecting a glass closure to a receptacle which comprises a hinge member having a groove for receiving one edge of said closure, a clamping member provided with groove for receiving the opposite edge of said closure, and means for drawing said members together for clamping said closure.

9. As an article of manufacture, a closure for a display vessel comprising a plate of glass, a hinge member having a groove for engaging one edge of said plate, a clamping member having a groove for receiving the opposite edge of said plate, means for forcing said members together for clamping said plate, a handle on said clamping member, and a ladle hook secured to said clamping means.

10. A display vessel comprising a receptacle member, a glass closure member for said receptacle member, a resilient gasket secured to one of said members, means for hinging said closure member to said receptacle member, friction means for holding said closure member in open position, and a spring latch for yieldingly holding said closure member in closed position for compressing said gasket.

11. A display device comprising a container having a cylindrical upper portion and a tapered lower portion, the external circumference of said tapered portion being less than that of said cylindrical portion, whereby an annular shoulder is formed at the junction of said upper and lower portions for supporting said container, a transparent closure, and means for hinging said closure to said cylindrical portion.

In testimony whereof I affix my signature.

RICHARD P. WHITE.